United States Patent [19]
Koseberg

[11] Patent Number: 5,447,227
[45] Date of Patent: Sep. 5, 1995

[54] CARRYING DEVICE FOR PET SUPPLIES

[76] Inventor: Robert Koseberg, 15115 ½ Sunset Blvd., Ste. D, Pacific Palisades, Calif. 90272

[21] Appl. No.: 89,222

[22] Filed: Jul. 8, 1993

[51] Int. Cl.⁶ ............................................. B65D 69/00
[52] U.S. Cl. .................................... 206/233; 206/38; 206/223
[58] Field of Search ................ 206/38, 223, 233, 579, 206/581, 494; 224/252

[56] References Cited

U.S. PATENT DOCUMENTS

| | | | |
|---|---|---|---|
| 3,819,043 | 6/1974 | Harrison | 206/494 |
| 3,989,080 | 11/1976 | Koszegi | 224/252 |
| 3,990,617 | 11/1976 | Carter | 224/252 |
| 4,420,080 | 12/1983 | Nakamura | 206/494 |
| 4,752,008 | 6/1988 | Pratt | 206/579 |
| 4,960,208 | 10/1990 | Tempke | 206/38 |
| 5,046,620 | 9/1991 | Barabino | 206/38 |

*Primary Examiner*—David T. Fidei
*Attorney, Agent, or Firm*—Andra M. Vaccaro

[57] ABSTRACT

The present invention is a device for carrying pet supplies comprising a first compartment for containing pet supplies having a first side, a second side, a top, a bottom, a front and a back; said front of said first compartment having an opening therein through which tissues and other items such as plastic sacks or the like may be removed one at a time. The first compartment has a flap affixed to said first compartment covering and protecting said opening. There is a second compartment adjacent to said first compartment having a first side, a second side, a top, a bottom, a front and a back. The tops of each compartment have means for opening and closing said compartments. The invention further comprises means for affixing items to the side of said first compartment and a third-compartment affixed to the side of said second compartment. There is also a pocket affixed to the back of said second compartment.

6 Claims, 2 Drawing Sheets

CARRYING DEVICE FOR PET SUPPLIES

BACKGROUND OF THE INVENTION

FIELD OF THE INVENTION

This invention relates to the field of carrying devices, specifically to devices that contain supplies for pets and the like.

There are thousands of items known in the art for carrying baby supplies, picnic supplies, etc. However, there are no such devices for pets, especially ones that have compartments for items such as plastic bags to store feces, doggie bones and other toys, etc.

Therefore, it is an object of the present invention to provide a device for containing pet supplies which is not cumbersome to the user and that has at least one compartment for containing plastic bags or tissues that can be removed one at a time.

It is another object of the present invention to provide a item in which removable, reusable and replaceable supplies may be carried.

It is yet another object of the present invention to provide a carry-all that has various compartments to contain items used or needed by a person walking a dog.

SUMMARY OF THE INVENTION

The present invention relates to a carrying device for pet supplies. The device of the present invention comprises a first compartment having a front, back, top and bottom. The front compartment may have a flap over the front thereof. The first compartment is capable of being open from the top or by raising the flap. The flap may be removably affixed to the front of the first compartment. The first compartment has two sides, one of which has a reusable means for holding an item such as a doggie bone, ball, toy or anything else that can be affixed by being contained around its middle. The top of first compartment may be opened through the use of a zipper, Velcro, etc. affixed thereto.

The first compartment has an opening in the front thereof, which is shaped so as to dispense tissues, plastic sacks for picking up fecal matter, etc. The opening is covered by the flap.

A second compartment is attached to the first compartment such that the first and second compartments share a wall. The second compartment also has a front, back, top and bottom. The second compartment has two sides, one of which has a reusable compartment for holding an item such as mace, an aerosol can, a toy or anything else that can be contained in a tall, slender compartment. The top of the second compartment may be opened through the use of a zipper, Velcro, etc. affixed thereto.

Along the back of the second compartment there may be a reusable pocket having elastic or zipper, therein so that it is constantly pressed against and in tension with the back of the second compartment. The compartment may or may not be divided.

The device is used by either affixing it to the belt or leash, around waists, or belt loops of the user by straps affixed to the upper back thereof or to a leash.

DESCRIPTION OF THE PREFERRED EMBODIMENTS

Figure 1:
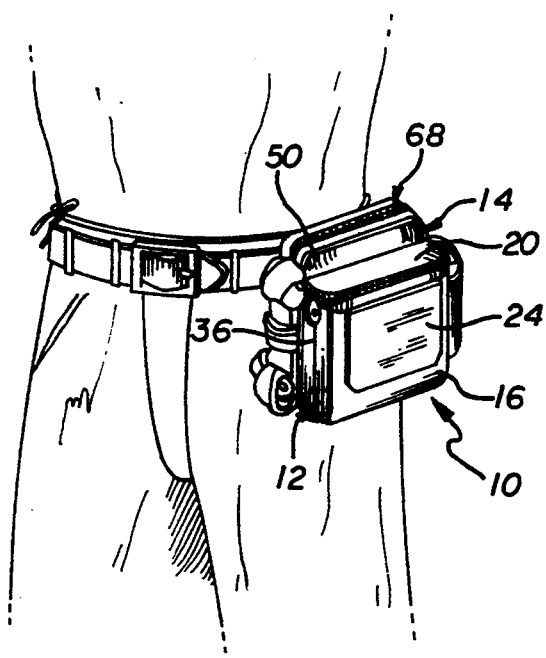
FIG. 1 is a perspective view of the preferred embodiment of the present invention containing a rawhide bone for illustration purposes, attached to the belt of the user.
Figure 2:
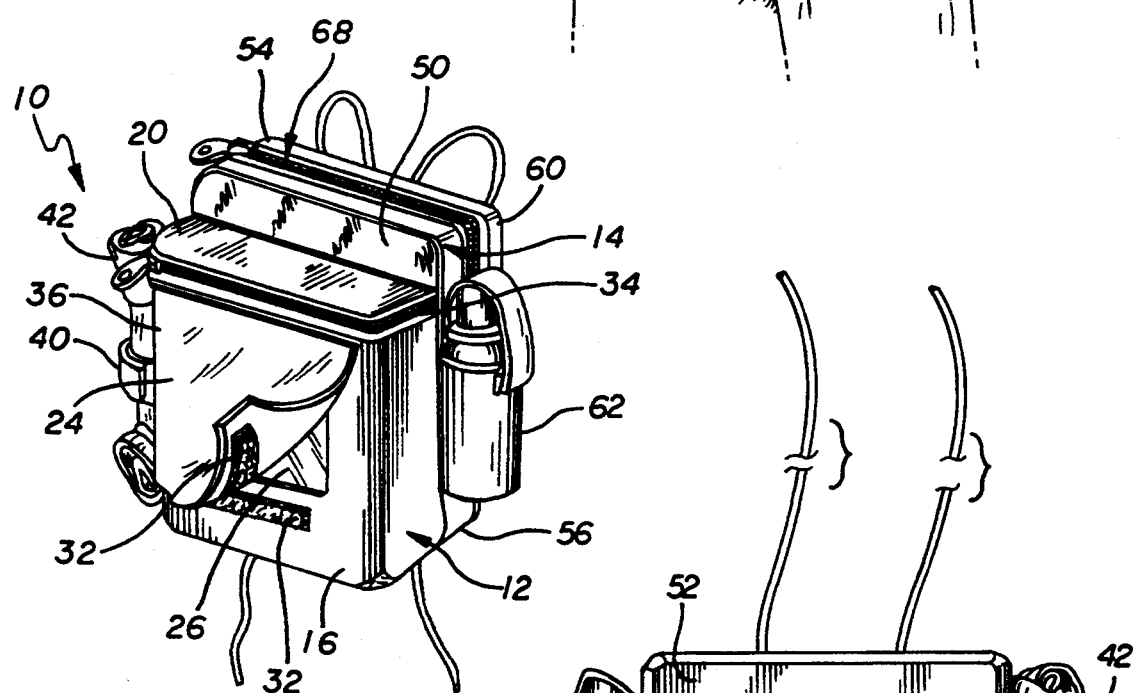
FIG. 2 is a perspective view of the first preferred embodiment of FIG. 1, wherein the flap is partially open showing the opening in the front thereof and an aerosol canister has been placed in a side compartment for illustration purposes.

Referring first to FIGS. 1-4, the preferred embodiment 10 of the present invention is shown. The device 10 comprises a first compartment 12 and a second compartment 14. The first compartment 12 has a front 16, a back 18, a top 20 and a bottom 22. The front 16 has an opening 26 therein. The opening is substantially the same size and shape as the opening 27 of a box 28 of tissues or plastic sacks 30 which may be placed in the first compartment 12. In the preferred embodiment the first compartment 12 is substantially rectangular in shape; however any shape is feasible so long as it adapts to the tissue or plastic sack container 28.

In the preferred embodiment the front 16 has a flap 24 thereover to protect and cover the opening 26. The flap 24 may be removable fixed by using hook and loop material 32 such as Velcro or the like. However, depending on the shape of the item, the flap may be deleted.

The first compartment 12 is capable of being open from the top 20. Top 20 is removably affixed to the compartment through a zipper 34 or the like. The first compartment 12 has two sides 36 and 38. In the preferred embodiment, one side 36 has a reusable means 40 for holding an item such as a doggie bone 42, toy or anything else that can be affixed by being contained around its middle. In the preferred embodiment the reusable means 40 are strips of hook and loop such as Velcro.

The second compartment 14 is attached to the first compartment 12 such that the first and second compartments 12 and 14 substantially share a wall 50. The second compartment also has a front 50, back 52, top 54 and bottom 56. The second compartment 14 has a first and a second side 58 and 60, respectively. One side 60 has a reusable compartment 62 for holding an item such as mace 64, an aerosol can, a toy or anything else that can be contained in a tall, slender compartment. Compartment 62 has a means 66 for containing an item therein, which in the preferred embodiment is hook and loop.

The top 54 of the second compartment 14 may be opened through the use of a zipper 68, Velcro, etc. which has been affixed thereto.

Figure 3:
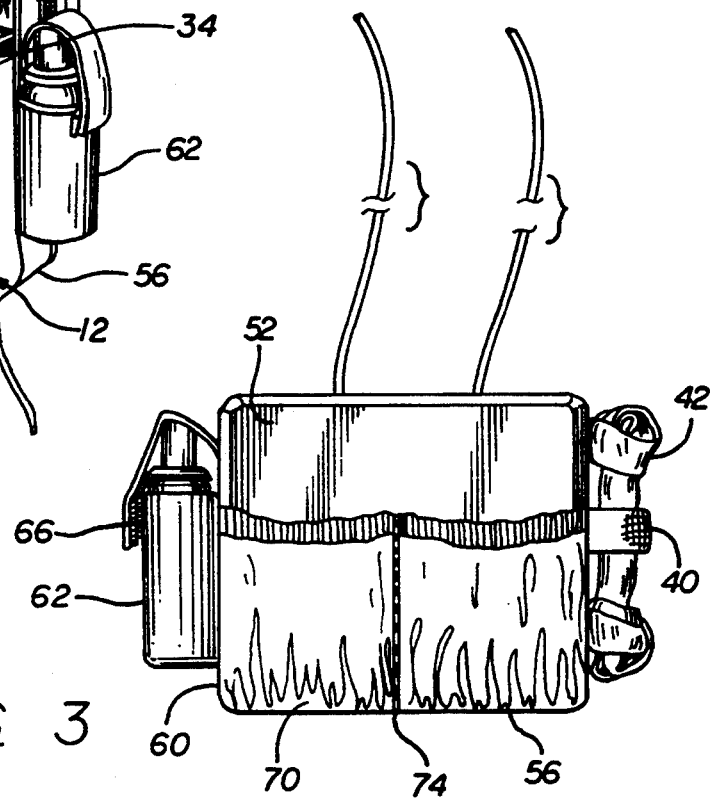
FIG. 3 is a plan view of the back of the preferred embodiment of the present invention.
Figure 4:
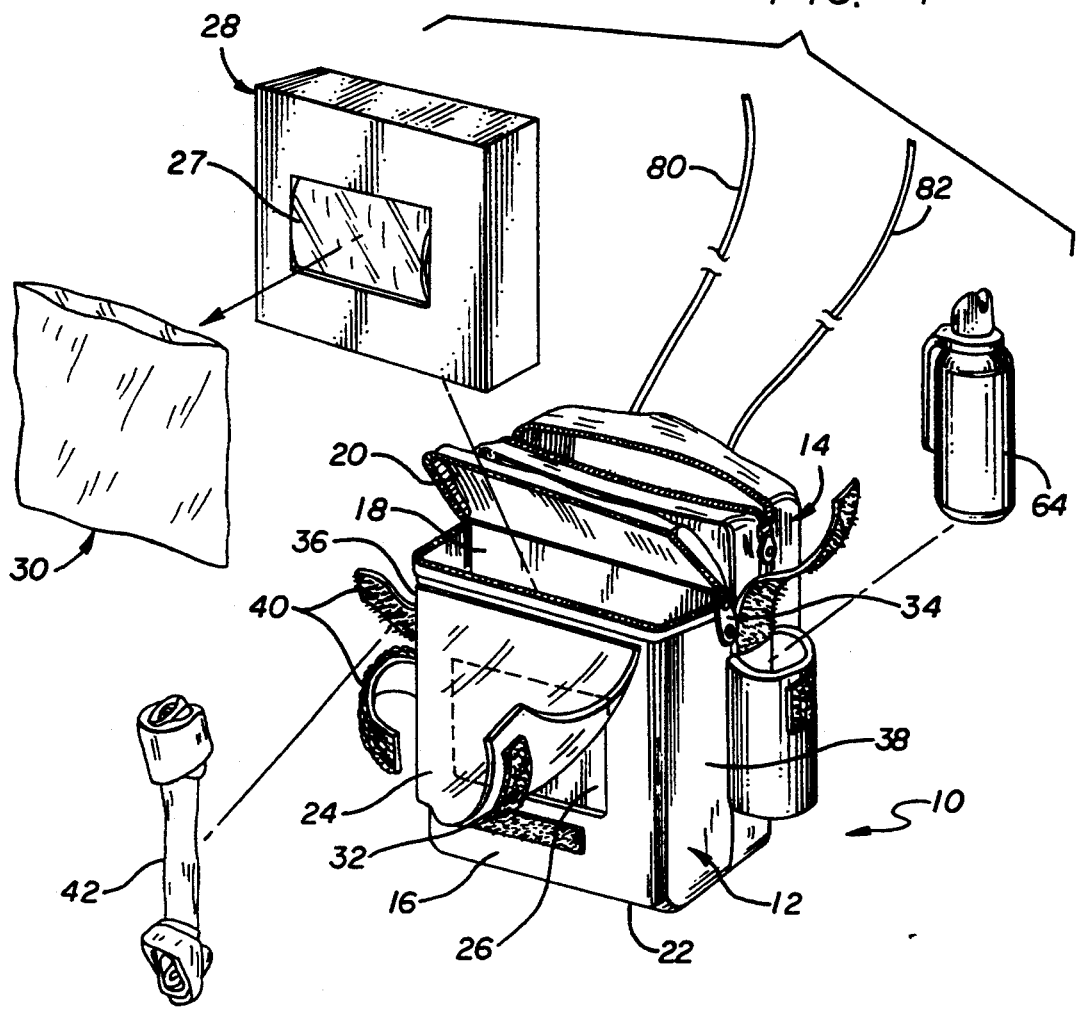
FIG. 4 is a perspective expanded view of the preferred embodiment of the present invention, wherein the rawhide bone is shown removed, the aerosol canister is shown removed, and a box containing plastic sacks is shown, which is placed in the opening of the invention.
Figure 5:
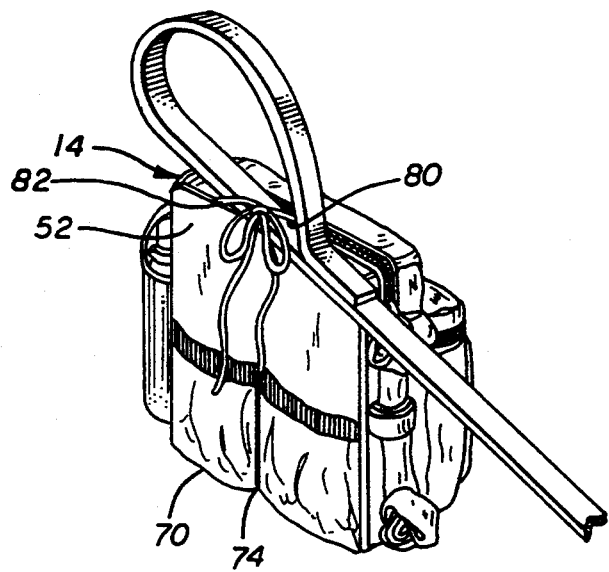
FIG. 5 is a perspective view of the preferred embodiment of the present invention showing the invention attached to a leash.

Referring more specifically to FIGS. 3 and 5, along the back 52 of the second compartment 14, may be a reusable pocket 70 having elastic 72 or other means for providing tension so that it is constantly pressed against and in tension with the back of the second compartment. The pocket 70 may or may not be divided. In the preferred embodiment the pocket is divided by stitching 74.

The present invention 10 is used by either affixing it to the belt or belt loops of the user as is shown in FIG. 1 by straps 80 and 82 affixed to the upper back thereof or can be affixed to a leash such as is shown in FIG. 5.

While in the preferred embodiment, the first compartment 12 has an opening, it does not necessary have to have one. Both the first and second compartment are used for carrying items a person might want to have with them when they are taking their dog for a walk.

The present invention may be comprised of nylon, canvas, dacron or any other material that provides flexibility. In the preferred embodiment, it is waterproof.

While particular embodiments of the invention have been shown and illustrated herein, it will be understood that many changes, substitutions and modifications may be made by those persons skilled in the art. It will be appreciated from the above description of presently preferred embodiments that other configurations are possible and within the scope of the present invention. Thus, the present invention is not intended to be limited to the particular embodiments specifically discussed hereinabove.

What is claimed is:

1. A device for carrying pet supplies and other items comprising:
    a first compartment for containing supplies having a first side, a second side, a top, a bottom, a front and a back; wherein said front of said first compartment has an opening therein,
    a second compartment for containing items adjacent to said first compartment having a first side, a second side, a top, a bottom, a front and a back;
    said tops of said first and second compartments having means for opening and closing said compartments;
    whereby when a box containing tissues or plastic sacks is placed in said first compartment, said plastic sacks or tissues may be removed from said first compartment one at a time through said opening in said first compartment.

2. The device of claim 1 further comprising a third compartment affixed to said second side of said second compartment for removably containing pet supplies therein.

3. The device of claim 1 further comprising means for holding pet supplies affixed to said first side of said first compartment.

4. The device of claim 1 further comprising a flap affixed to the front thereof for covering and protecting said opening.

5. The device of claim 1 further comprising means for affixing the device to the belt or the leash of a user.

6. A device for carrying pet supplies comprising:
    a first compartment for containing pet supplies having a first side, a second side, a top, a bottom, a front and a back; wherein said front of said first compartment has an opening therein;
    a flap affixed to said first compartment covering and protecting said opening;
    a second compartment adjacent to said first compartment having a first side, a second side, a top, a bottom, a front and a back;
    said tops of said first and second compartments having means for opening and closing said compartments;
    means for affixing items to the side of said first compartment;
    a third compartment affixed to the side of said second compartment;
    pocket means affixed to the back of said second compartment;
    whereby when a box containing tissues or plastic sacks is placed in said first compartment, said plastic sacks or tissues may be removed from said first compartment one at a time through said opening in said first compartment by raising said flap.

* * * * *